United States Patent
Lai et al.

(10) Patent No.: US 8,003,074 B2
(45) Date of Patent: Aug. 23, 2011

(54) SYNTHESIS OF HIGH ACTIVITY ZSM-48

(75) Inventors: Wenyih Frank Lai, Bridgewater, NJ (US); Wieslaw J. Roth, Sewell, NJ (US); Robert E. Kay, Easton, PA (US); Christine N. Elia, Bridgewater, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 792 days.

(21) Appl. No.: 11/901,490

(22) Filed: Sep. 18, 2007

(65) Prior Publication Data
US 2009/0076317 A1 Mar. 19, 2009

(51) Int. Cl.
*C01B 39/04* (2006.01)
*C10G 73/42* (2006.01)
*C10G 49/08* (2006.01)

(52) U.S. Cl. .................. 423/704; 423/708
(58) Field of Classification Search .............. 423/703, 423/704, 708; 208/28, 111.01
See application file for complete search history.

(56) References Cited

U.S. PATENT DOCUMENTS

| | | | |
|---|---|---|---|
| 4,375,573 A * | 3/1983 | Young | 585/467 |
| 4,397,827 A | 8/1983 | Chu | |
| 4,423,021 A | 12/1983 | Rollmann et al. | |
| 4,448,675 A * | 5/1984 | Chu | 208/118 |
| 4,585,747 A | 4/1986 | Valyocsik | |
| 5,075,269 A * | 12/1991 | Degnan et al. | 502/77 |
| 5,961,951 A | 10/1999 | Kennedy et al. | |
| 6,884,339 B2 | 4/2005 | Benazzi et al. | |
| 6,923,949 B1 | 8/2005 | Lai et al. | |
| 7,482,300 B2 * | 1/2009 | Lai et al. | 502/60 |
| 7,625,478 B2 * | 12/2009 | Lai et al. | 208/28 |
| 7,910,785 B2 * | 3/2011 | Roth et al. | 585/467 |
| 2004/0101475 A1 * | 5/2004 | Mertens et al. | 423/708 |
| 2007/0131581 A1 * | 6/2007 | Lai et al. | 208/27 |
| 2007/0131582 A1 * | 6/2007 | Lai et al. | 208/28 |
| 2007/0134152 A1 * | 6/2007 | Caullet et al. | 423/700 |
| 2008/0045768 A1 * | 2/2008 | Roth et al. | 585/899 |
| 2011/0105302 A1 * | 5/2011 | Burton | 502/74 |

FOREIGN PATENT DOCUMENTS

EP 0 142 317 A2 5/1983
(Continued)

OTHER PUBLICATIONS

Song-Ho Lee, et al., "Reinvestigation into the synthesis of zeolites using diquaternary alkylammonium ions $(CH_3)_3N^+(CH_2)_nN^+(CH_3)_3$ with n = 3-10 as structure-directing agents", *Microporous and Mesoporous Materials*, vol. 68 (2004) 97-104.

(Continued)

*Primary Examiner* — David M Brunsman
(74) *Attorney, Agent, or Firm* — Ann M. Mareschal; David M. Weisberg (57) ABSTRACT

A process for producing ZSM-48 comprises crystallizing an aqueous reaction mixture comprising at least one source of silica, at least one source of alumina, at least one source of hydroxyl ions, at least one source of diquaternary alkylammonium, $R^{2+}$, ions having the formula:

$$(CH_3)_3N^+(CH_2)_5N^+(CH_3)_3$$

and optionally ZSM-48 seed crystals, wherein said reaction mixture has a composition including the following molar ratios:

| | |
|---|---|
| $R^{2+}:SiO_2$ | less than 0.1 |
| $SiO_2:Al_2O_3$ | less than 100 |
| $OH^-:SiO_2$ | less than 0.2. |

18 Claims, 6 Drawing Sheets

FOREIGN PATENT DOCUMENTS

| | | |
|---|---|---|
| EP | 0 015 132 B1 | 2/1984 |
| FR | 2 805 762 | 9/2001 |
| WO | PCT/WO 99/35087 | 7/1999 |
| WO | PCT/WO 01/64339 A1 | 9/2001 |
| WO | PCT/WO 01/81508 A1 | 11/2001 |
| WO | PCT/WO2007/070521 A1 | 6/2007 |

OTHER PUBLICATIONS

A. Moini, et al., "The role of diquaternary cations as directing agents in zeolite synthesis", *Zeolites*, 1994, vol. 14, September/October, 504-511.

* cited by examiner

SYNTHESIS OF HIGH ACTIVITY ZSM-48

FIELD

This invention relates to the synthesis of high activity ZSM-48 and its use as a catalyst, especially in the dewaxing of hydrocarbon feedstocks.

BACKGROUND

ZSM-48 is a zeolite with orthorhombic or pseudo-orthorhombic symmetry having ten-ring non-interconnecting, linear channels whose ideal dimensions are 5.5×5.6 Å. ZSM-48 has shown attractive properties as a catalyst for the dewaxing of hydrocarbon feedstocks, see for example U.S. Pat. Nos. 5,075,269 and 6,884,339 and International Publication WO 01/64339. As a result, there is considerable interest in finding new methods of synthesizing ZSM-48 and, in particular, ZSM-48 with high acid activity (that is, low silica/alumina molar ratio).

ZSM-48 was first synthesized by Rollmann et al. using a $C_4$ to $C_{12}$ organic diamine as a structure-directing agent, see U.S. Pat. No. 4,423,021. As synthesized by Rollman et al., the zeolite contained little or no aluminum and so had little acid activity.

Synthesis of ZSM-48, again with a high silica to alumina molar ratio, in the presence of a mixture of a $C_2$ to $C_{12}$ alkylamine and a $C_3$ to $C_5$ tetramethylammonium compound is described in U.S. Pat. No. 4,397,827 and in the presence of bis(N-methylpyridyl)ethylinium cations in U.S. Pat. No. 4,585,747.

U.S. Pat. No. 5,961,951 discloses synthesis of ZSM-48 in the presence of ethylene diamine as the structure-directing agent. However, the broad definition of the reaction mixture requires a silica/alumina molar ratio of at least 100 and the only example for which the composition of the ZSM-48 product is cited, Example 2, reports the silica/alumina molar ratio as being 170.

European Patent Publication EP-A-142317 discloses synthesis of ZSM-48 in the presence of certain linear diquaternary compounds having the general formula:

in which each R' is an alkyl or heteroalkyl group having from 1 to 20 carbon atoms, a cycloalkyl or cycloheteroalkyl group having from 3 to 6 carbon atoms or an aryl or heteroaryl group; Z is an alkylene or heteroalkylene group having from 1 to 20 carbon atoms, an alkenylene or heteroalkenylene group having from 2 to 20 carbon atoms or an arylene or heteroarylene group; m is 5, 6, 8, 9 or 10 and $X^-$ is an anion. EP-A-142317 reports that the silica/alumina molar ratio of the reaction mixture must be at least 100 since at lower values a different silicate framework is produced.

U.S. Pat. No. 6,923,949 discloses pure phase ZSM-48 crystals having a $XO_2/Y_2O_3$ ratio of less than about 150/1, where X is at least one of Si or Ge, preferably Si, and Y is at least one of Al, Ga, B, Fe, Ti, V and Zr, preferably Al, and free from ZSM-50 and Kenyaite impurities having a diameter of less than about 1 micron and being substantially free of fibrous morphology. The material is produced by crystallizing a reaction mixture comprising at least one organic template material selected from organic linear diquaternary alkyl ammonium compounds and linear diamino alkanes, and heterostructural zeolite seeds selected from ZSM-5, ZSM-11, ZSM-12, colloidal BEA, Beta, X and Y zeolites. The Examples employ hexamethonium chloride as the linear diquaternary alkyl ammonium compound and produce ZSM-48 crystals with a $SiO_2/Al_2O_3$ molar ratio as low as 67.7.

International Publication No. WO 2007/070521 discloses synthesis of a composition comprising ZSM-48 crystals having a silica:alumina molar ratio of 110 or less that is free of non ZSM-48 crystals and free of ZSM-50 by crystallizing a reaction mixture comprising an aqueous mixture of silica or silicate salt, alumina or aluminate salt, hexamethonium salt and alkali base wherein the reaction mixture has the following molar ratios: silica:alumina molar ratio from 70 to 110, base:silica from 0.1 to 0.3 and hexamethonium salt:silica from 0.01 to 0.05. Production of ZSM-48 crystals with a silica:alumina molar ratio as low as 80 are exemplified.

In an article entitled "Reinvestigation into the synthesis of zeolites using diquaternary alkylammonium ions $(CH_3)_3N^+(CH_2)_nN^+(CH_3)_3$ with n=3–10 as structure-directing agents", *Microporous and Mesoporous Materials*, 68 (2004), 97–104, Song-Ho Lee et al. describe the effects of synthesis variables, especially, the type and concentration of alkali cations on the phase selectivity of zeolite crystallization in the presence of $Me_6$-diquat-n ions where n varies between 3 and 10. In particular, Song-Ho Lee et al. report in Table 2 that with a synthesis mixture containing $Me_6$-diquat-5 and having an silica/alumina molar ratio of 60 and a diquat/silica molar ratio of 0.1, crystallization produces ZSM-48 when the $OH^-/SiO_2$ molar ratio of the mixture is 0.33 or less but produces ZSM-48 at an $OH^-/SiO_2$ molar ratio of 0.47 and MCM-22 at $OH^-/SiO_2$ molar ratios of 0.6 and 0.73. At even higher $OH^-/SiO_2$ molar ratios, the product is mordenite and/or analcime.

According to the invention, it has now been found that, in the synthesis of high activity ZSM-48 using $Me_6$-diquat-5 as a structure-directing agent, the diquat/silica molar ratio is a critical variable impacting the phase selectivity of the product. Moreover, it has been found that by using a combination of $Me_6$-diquat-5 and $Me_6$-diquat-6 as the structure-directing agent, it is possible to exercise control over the morphology of the resultant ZSM-48 crystals.

SUMMARY

In one aspect, the present invention resides in a process for producing ZSM-48, the process comprising:

(a) providing an aqueous reaction mixture comprising at least one source of silica, at least one source of alumina, at least one source of hydroxyl ions, at least one source of diquaternary alkylammonium, $R^{2+}$, ions having the formula:

and optionally seed crystals, wherein said reaction mixture has a composition including the following molar ratios:

| | |
|---|---|
| $R^{2+}:SiO_2$ | less than 0.1 |
| $SiO_2:Al_2O_3$ | less than 100 |
| $OH^-:SiO_2$ | less than 0.2; and |

(b) crystallizing said reaction mixture under conditions effective to produce said ZSM-48.

Conveniently, said reaction mixture has a composition including the following molar ratios:

| | |
|---|---|
| $R^{2+}:SiO_2$ | from about 0.01 to about 0.05 |
| $SiO_2:Al_2O_3$ | from about 50 to less than 100 |
| $OH^-:SiO_2$ | from about 0.1 to about 0.2. |

Conveniently, said reaction mixture has an $H_2O:SiO_2$ molar ratio less than 30 and in one embodiment also comprises a source of sodium cations, typically such that the mixture has a $Na^+:SiO_2$ molar ratio less than 0.2.

Conveniently, said reaction mixture also comprises a source of further diquaternary alkylammonium ions having the formula $(CH_3)_3N^+(CH_2)_nN^+(CH_3)_3$ where n is 3, 4, 6, 7, 8, 9 or 10 and especially where n is 6.

In a further aspect, the present invention resides in a process for producing ZSM-48, the process comprising crystallizing an aqueous reaction mixture comprising at least one source of silica, at least one source of alumina, at least one source of hydroxyl ions, at least one source of first diquaternary alkylammonium ions having the formula:

at least one source of second diquaternary alkylammonium ions having the formula:

where n is 3, 4, 6, 7, 8, 9 or 10 and especially is 6, and optionally, seed crystals.

Conveniently, said reaction mixture has a $SiO_2:Al_2O_3$ molar ratio less than 100.

Conveniently, the molar ratio of total diquaternary alkylammonium ions to $SiO_2$ in the reaction mixture is less than 0.1.

In all of the above embodiments, the reaction mixture preferably comprises seed crystals, more preferably ZSM-48 seed crystals. Conveniently, the ZSM-48 seed crystals are present in an amount between about 50 ppm by weight to about 50,000 ppm by weight of the reaction mixture.

Conveniently, the crystallizing conditions include a temperature of about 120° C. to about 200° C. for a time of about 12 to about 200 hours.

In yet a further aspect, the present invention resides in a method for dewaxing a hydrocarbon feedstock, comprising contacting the hydrocarbon feedstock under dewaxing conditions with ZSM-48 prepared by the process described herein.

DETAILED DESCRIPTION

The present invention is directed to a process for producing ZSM-48, especially high activity ZSM-48 having a silica to alumina molar ratio less than 100, and to the use of the resultant ZSM-48 as a catalyst in dewaxing hydrocarbon feedstocks.

In the present process, ZSM-48 is produced by crystallizing an aqueous reaction mixture comprising at least one source of silica, at least one source of alumina, at least one source of hydroxyl ions, a directing agent comprising at least one source of $Me_6$-diquat-5 ions, also referred to herein as pentamethonium ions, which are diquaternary alkylammonium ions having the formula:

and optionally seed crystals, wherein the aqueous reaction mixture has a composition including the following molar ratios:

| | |
|---|---|
| $R^{2+}:SiO_2$ | less than 0.1, such as from about 0.01 to about 0.05 |
| $SiO_2:Al_2O_3$ | less than 100, such as from about 50 to less than 100, and |
| $OH^-:SiO_2$ | less than 0.2, such as from about 0.1 to about 0.2. |

Generally, the reaction mixture also has an $H_2O:SiO_2$ molar ratio less than 30, or even less than 20, so that higher yields of the desired ZSM-48 product can be produced. In one embodiment, the reaction mixture also comprises a source of sodium cations, typically such that the reaction mixture has a $Na^+:SiO_2$ molar ratio less than 0.2. A suitable source of sodium ions is sodium hydroxide, which of course also provides a suitable source of hydroxyl ions.

The reaction mixture preferably contains seed crystals, typically zeolite seed crystals of a different or identical framework type as ZSM-48. More preferred seed crystals are ZSM-48 seed crystals. If used, the ZSM-48 seed crystals are generally added to the aqueous reaction mixture so as to be present in an amount between about 50 ppm by weight to about 50,000 ppm by weight. In general, at least 100 ppm by weight of seed crystal is employed, preferably 100 ppm to 5000 ppm by weight, more preferably 500 ppm to 3000 ppm by weight, of the reaction mixture. In one embodiment, the ZSM-48 selected for use as the seed crystals has a silica to alumina molar ratio less than 100.

Any reactive form of silica can be employed as a source of silica in the present reaction mixture, with suitable commercially available materials being fumed silica, precipitated silica, silica gels, silicic acid, a tetraalkyl orthosilicate, or an aqueous colloidal suspension of silica. In general, fumed silica appears to assist in producing ZSM-48 with a low silica to alumina molar ratio and high purity.

Similarly, any reactive form of alumina can be employed as an alumina source, although generally water soluble sources of alumina such as an aluminate or an aluminum salt, such as aluminum nitrate, are preferred. Other suitable sources of alumina include hydrated alumina, such as gamma-alumina, pseudobohemite and colloidal alumina.

The source of $Me_6$-diquat-5 ions in the reaction mixture can be any readily available pentamethonium salt, such as a dihalide, especially a dichloride or dibromide, or pentamethonium dihydroxide.

Although the present synthesis process can be employed with $Me_6$-diquat-5 ions as the only structure directing agent, in some embodiments it may be desirable to employ a mixture of $Me_6$-diquat-5 ions with at least one different diquaternary ammonium compound as the structure directing agent. In this case, the different diquaternary ammonium compound has the formula:

$$(CH_3)_3N^+(CH_2)_nN^+(CH_3)_3$$

where n is 3, 4, 6, 7, 8, 9 or 10 and especially is 6. The Me$_6$-diquat-6 cation is also referred to herein as the hexamethonium cation. Thus, it is found that by using such a mixture of diquaternary ammonium compounds, and in particular a mixture of Me$_6$-diquat-5 ions and Me$_6$-diquat-6 ions, it may be possible to produce ZSM-48 with a lower silica to alumina molar ratio and/or a different morphology that is obtainable with either diquat alone. For example, although Me$_6$-diquat-5 alone appears to favor the formation of ZSM-48 with needle- or fibrous-like morphology, a mixture Me$_6$-diquat-5 ions and Me$_6$-diquat-6 ions seems to favor crystals with a lower length to diameter ratio.

Where a mixture of Me$_6$-diquat-5 ions with at least one different diquaternary ammonium compound is employed as the structure directing agent, the molar ratio of the Me$_6$-diquat-5 ions to said at least one different diquaternary ammonium compound is generally such that Me$_6$-diquat-5 ions represent 10% to 90% of the total diquaternary alkylammonium ions. Moreover, the total amount of the Me$_6$-diquat-5 ions and said at least one different diquaternary ammonium compound present in the reaction is generally arranged so that the molar ratio of total diquaternary alkylammonium ions to SiO$_2$ is less than 0.1.

The crystallization conditions used in the present process are not closely controlled but in general include a temperature of about 120° C. to about 200° C., such as about 140° C. to about 180° C., for a time of about 12 to about 200 hours, such as about 20 to about 120 hours. Crystallization can be carried out at either static or, preferably, stirred conditions in a suitable reactor vessel, such as for example, polypropylene jars or Teflon™-lined or stainless steel autoclaves. When crystallization is complete, the ZSM-48 product is separated from the mother liquor, typically by filtration or centrifuging, and recovered.

The ZSM-48 produced by the present process generally has the following molar composition in its as-synthesized, anhydrous form:

$$(0.01 \text{ to } <0.1)R^{2+}:(0.1 \text{ to } <0.2)M_{2/n}:xAl_2O_3:SiO_2$$

where R$^{2+}$ is one or more diquaternary ammonium compounds including Me$_6$-diquat-5, M is at least one alkali or alkali metal cation of valence n, especially sodium, and x is greater than 0.01, typically greater than 0.0125, such as about 0.013 to about 0.02.

In its as-synthesized, anhydrous form, the ZSM-48 produced by the present process has an X-ray diffraction pattern including the lines set out in Table 1 below.

TABLE 1

| d (Å) | Relative Intensity (I/Io) |
|---|---|
| 11.8 ± 0.2 | W-VS |
| 10.2 ± 0.2 | W-M |
| 7.2 ± 0.15 | W |
| 4.2 ± 0.08 | VS |
| 3.9 ± 0.08 | VS |
| 3.6 ± 0.08 | W |
| 3.1 ± 0.08 | W |
| 2.85 ± 0.08 | W |

These values were determined by standard techniques. The radiation was the K-alpha doublet of copper, and a diffractometer equipped with a scintillation counter with a strip chart pen record was used. The peak heights, intensity (I), and the positions as function of 2 times theta, where theta is the Bragg angle, were read from the spectrometer chart. From these, the relative intensities, 100 I/Io, where Io is the intensity of the strongest line or peak, and d (obs.), the interplanar spacing in Å, corresponding to the recorded lines, were calculated. In Table 1 the relative intensities are given in terms of the symbols W for weak, VS for very strong and W-S for weak-to-strong (depending on the cationic form). Ion exchange of the sodium ion with cations reveals substantially the same pattern with some minor shifts in interplanar spacing and variations in relative intensity. Other minor variations can occur depending on the silicon to aluminum ratio of the particular sample, as well as if it has been subjected to thermal treatment.

The ZSM-48 product of the present process generally contains water from the reaction mixture and so normally requires at least partial dehydration before being used as, for example, a catalyst. Dehydration is generally achieved by heating the as-synthesized product to a temperature in the range of from about 100° C. to about 600° C. in an atmosphere, such as air, nitrogen, etc. and at atmospheric pressure from between about 1 and about 48 hours. Dehydration can also be performed at room temperature merely by placing the ZSM-48 in a vacuum, but a longer time is required to obtain a sufficient amount of dehydration.

The as-synthesized ZSM-48 product also contains the or each diquaternary ammonium compound used as the directing agent in it synthesis and hence, prior to use, the product is normally activated by removal of the organic material, leaving active catalytic sites within the microporous channels of the molecular sieve open for contact with a feedstock. The activation process is typically accomplished by heating the as-synthesized ZSM-48 product at a temperature of from about 200° C. to about 800° C., normally in the presence of an oxygen-containing gas.

Where the ZSM-48 produced by the present process is to be used as a catalyst, it may be desirable to combine the ZSM-48 with another material resistant to the temperatures and other conditions employed in organic conversion processes. Such materials include catalytically active and inactive materials and synthetic or naturally occurring zeolites as well as inorganic materials such as clays, silica and/or metal oxides. The latter may be either naturally occurring or in the form of gelatinous precipitates or gels including mixtures of silica and metal oxides. Use of a catalytically active material in conjunction with the ZSM-48 produced by the present may improve the conversion and/or selectivity of the catalyst in certain organic conversion processes. Inactive materials suitably serve as diluents to control the amount of conversion in a given process so that products can be obtained economically and without employing other means for controlling the rate of reaction. These materials may be incorporated into naturally-occurring clays, e.g., bentonite and kaolin, to improve the crush strength of the catalyst under commercial operating conditions. Such material, i.e., clays, oxides, etc., function as binders for the catalyst. It is desirable to provide a catalyst having good crush strength because in a petroleum refinery the catalyst is often subjected to rough handling, which tends to break the catalyst down into powder-like materials, which cause problems in processing. These clay binders have been employed for the purpose of improving the crush strength of the catalyst.

Naturally-occurring clays which can be composited with the ZSM-48 produced by the present process include montmorillonite and kaolin families. These families include sub-bentonites, and kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the ZSM-48 also include inorganic oxides, notably alumina.

In addition to the foregoing materials, the ZSM-48 produced by the present process can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The relative proportions of finely divided ZSM-48 and inorganic oxide gel matrix vary widely with the ZSM-48 content ranging from about 1 to about 90 percent by weight and more usually, particularly when the composite is prepared in the form of beads, in the range from about 2 to about 70 percent by weight of the composite.

The ZSM-48 produced herein can be used as an adsorbent and as a catalyst for a wide variety of organic conversion processes, but in general is intended for use as a hydrocarbon dewaxing catalyst. With such an application, it may be desirable employ the ZSM-48 in combination with a metal component capable of providing the catalysts with a hydrogenation-dehydrogenation function. Suitable metal components include tungsten, vanadium, molybdenum, rhenium, nickel, cobalt, chromium, manganese, or a noble metal such as platinum or palladium. Such component can be exchanged into the composition, impregnated therein or physically intimately admixed therewith. Such component can be impregnated in or onto it such as, for example, by, in the case of platinum, treating with a solution containing platinum metal-containing ions. Thus, suitable platinum compounds include chloroplatinic acid, platinous chloride and various compounds containing the platinum ammine complex.

Catalyst containing ZSM-48 produced by the present process are particularly useful in the dewaxing catalysts of lube oil basestocks. Such feedstocks are wax-containing feeds that boil in the lubricating oil range, typically having a 10% distillation point greater than 650° F. (343° C.), measured by ASTM D 86 or ASTM D2887. Such feeds may be derived from a number of sources such as oils derived from solvent refining processes such as raffinates, partially solvent dewaxed oils, deasphalted oils, distillates, vacuum gas oils, coker gas oils, slack waxes, foots oils and the like, and Fischer-Tropsch waxes. Preferred feeds are slack waxes and Fischer-Tropsch waxes. Slack waxes are typically derived from hydrocarbon feeds by solvent or propane dewaxing. Slack waxes contain some residual oil and are typically deoiled. Foots oils are derived from deoiled slack waxes. Fischer-Tropsch waxes are prepared by the Fischer-Tropsch synthetic process.

Dewaxing conditions with such lube oil basestocks typically include temperatures of up to 426° C., such as from about 250° C. to about 400° C., for example from about 275° C. to about 350° C., pressures of from about 791 to about 20786 kPa (100 to 3000 psig), such as from about 1480 to about 17339 kPa (200 to 2500 psig), liquid hourly space velocities from about 0.1 to about 10 $hr^{-1}$, such as from about 0.1 to about 5 $hr^{-1}$ and hydrogen treat gas rates from about 45 to about 1780 $m^3/m^3$ (250 to 10000 scf/B), such as from about 89 to about 890 $m^3/m^3$ (500 to 5000 scf/B).

In addition, catalysts containing ZSM-48 produced by the present process can also be used for hydroisomerization of normal paraffins, particularly when provided with a hydrogenation component, e.g., platinum. Typically hydroisomerization is carried out at a temperature from about 100° C. to about 400° C., such as about 150° C. to about 300° C., with a liquid hourly space velocity between about 0.01 and about 2 $hr^{-1}$, such as between about 0.25 and about 0.50 $hr^{-1}$ employing hydrogen such that the hydrogen to hydrocarbon mole ratio is between about 1:1 and about 5:1.

The invention will now be more particularly described with reference to the following non-limiting Examples.

Example 1

Preparation of High Activity ZSM-48 using Diquat-5 and Low $OH^-/SiO_2$ Ratio

A mixture was prepared from 1040 g of water, 45 g of Pentamethonium dibromide (50% solution), 200 g of Ultrasil silica, 11 g of sodium aluminate solution (45%), and 36 g of 50% sodium hydroxide solution. Then 5 g of ZSM-48 seeds was added to the mixture. The mixture had the following molar composition:

| | |
|---|---|
| $SiO_2/Al_2O_3$ | 102 |
| $H_2O/SiO_2$ | 20 |
| $OH^-/SiO_2$ | 0.17 |
| $Na^+/SiO_2$ | 0.17 |
| Diquat-5/$SiO_2$ | 0.02 |

Figure 1A:
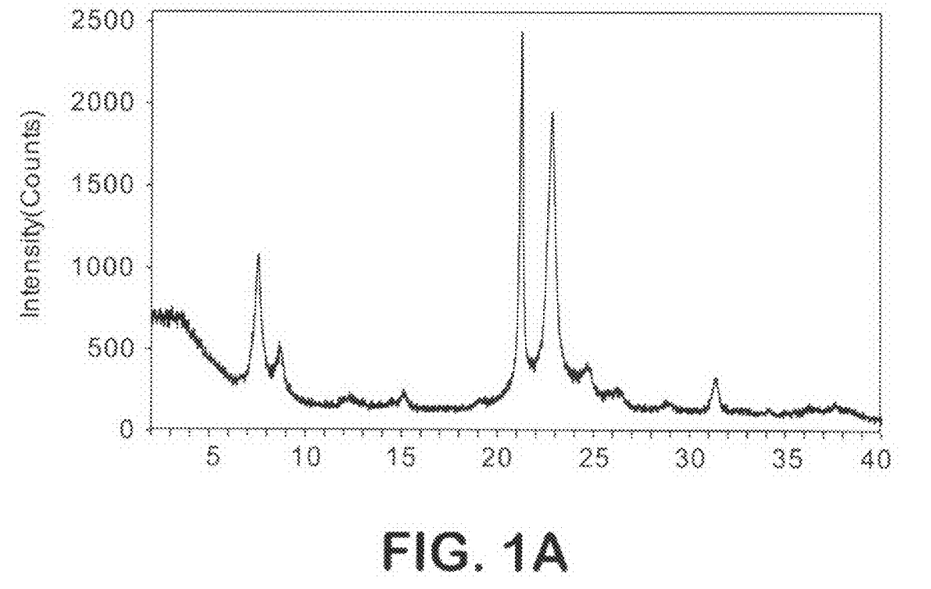
FIG. 1A is an X-ray diffraction pattern of the as-synthesized product of Example 1.
Figure 1B:
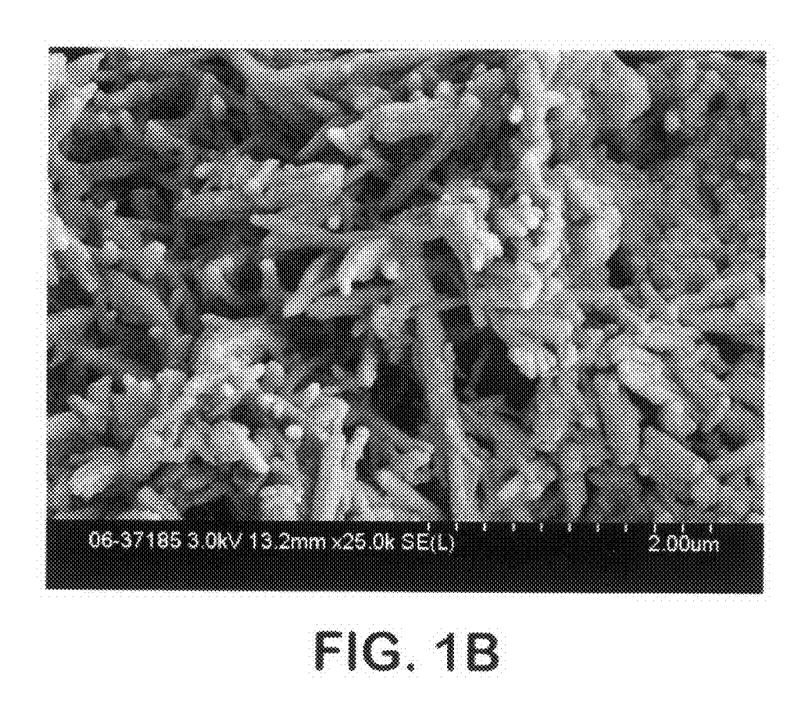
FIG. 1B is a scanning electron micrograph (SEM) of the as-synthesized product of Example 1.

The mixture was reacted at 320° F. (160° C.) in a 2-liter autoclave with stirring at 350 RPM for 48 hours. The product was filtered, washed with deionized (DI) water and dried at 250° F. (120° C.). The XRD pattern (see FIG. 1A) of the as-synthesized material showed the typical pure phase of ZSM-48 topology. The SEM (see FIG. 1B) of the as-synthesized material showed that the material was composed of agglomerates of elongated needle-like crystals. The as-synthesized crystals were converted into the hydrogen form by three ion exchanges with ammonium nitrate solution at room temperature, followed by drying at 250° F. (120° C.) and calcination at 1000° F. (540° C.) for 6 hours. The resulting ZSM-48 crystals had a $SiO_2/Al_2O_3$ molar ratio of 90.4, surface area of 265 $m^2/g$, and an Alpha value of 69.

Example 2

Comparative

Preparation of Medium Activity ZSM-48 using Diquat-5, Low $OH^-/SiO_2$ Ratio and High $SiO_2/Al_2O_3$ A mixture was prepared from 1100 g of water, 65 g of Pentamethonium dibromide (50% solution), 228 g of Ultrasil silica, 6 g of sodium aluminate solution (45%), and 45 g of 50% sodium hydroxide solution. The mixture had the following molar composition:

| | |
|---|---|
| $SiO_2/Al_2O_3$ | 195 |
| $H_2O/SiO_2$ | 19 |
| $OH^-/SiO_2$ | 0.17 |
| $Na^+/SiO_2$ | 0.17 |
| Diquat-5/$SiO_2$ | 0.027 |

Figure 2A:
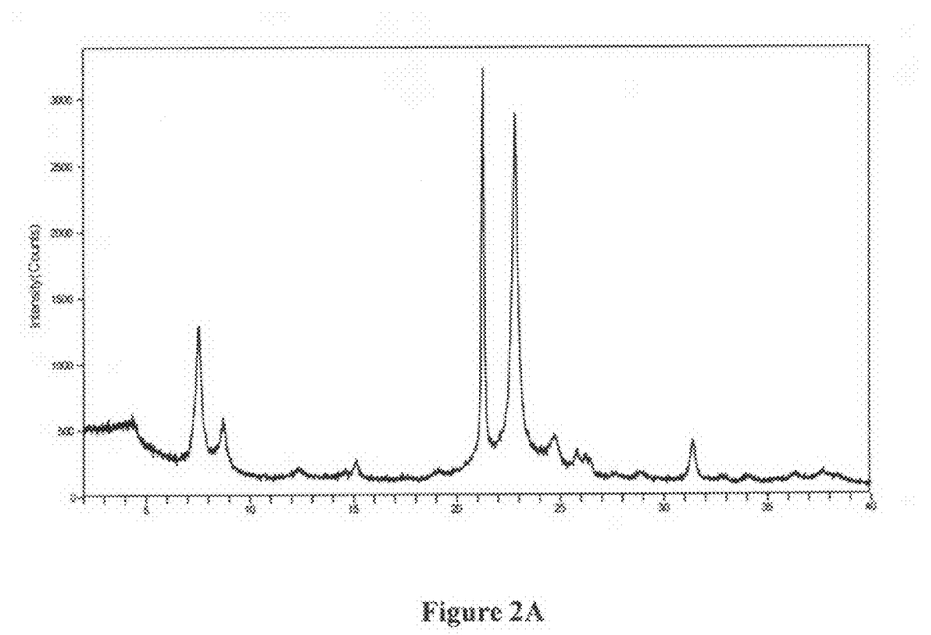
FIG. 2A is an X-ray diffraction pattern of the as-synthesized product of Example 2.
Figure 2B:
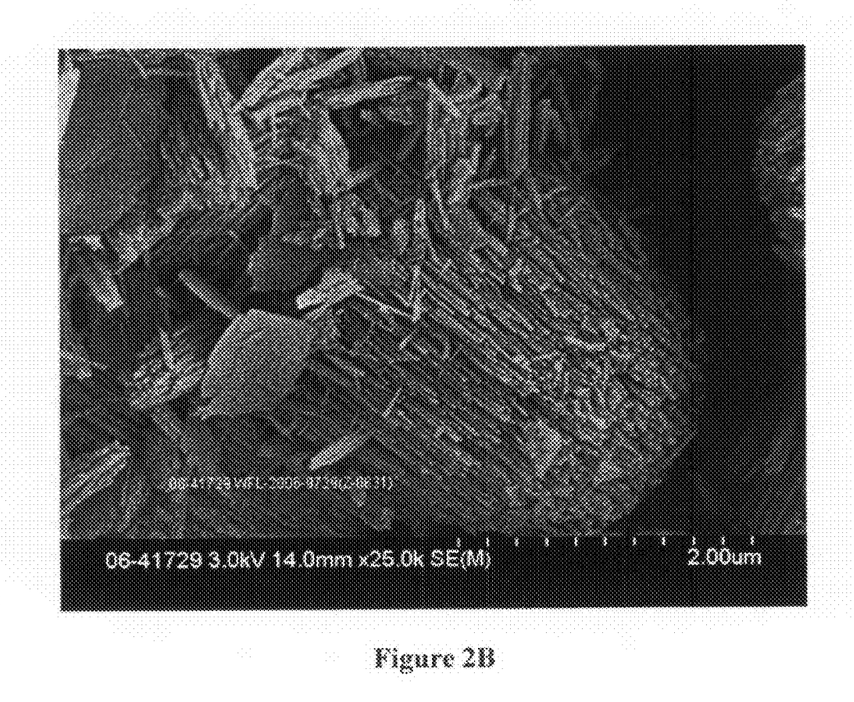
FIG. 2B is a scanning electron micrograph (SEM) of the as-synthesized product of Example 2.

The mixture was reacted at 320° F. (160° C.) in a 2-liter autoclave with stirring at 350 RPM for 48 hours. The product was filtered, washed with deionized (DI) water and dried at 250° F. (120° C.). The XRD pattern (see FIG. 2A) of the as-synthesized material showed the typical pure phase of ZSM-48 topology. The SEM (see FIG. 2B) of the as-synthesized material shows that the material was composed of agglomerates of fibrous-like crystals. The resulting ZSM-48 as-synthesized crystals had a $SiO_2/Al_2O_3$ molar ratio of about 170/1.

Example 3

Comparative

Preparation of High Activity ZSM-48 using Diquat-5 and High $OH^-/SiO_2$ Ratio

A mixture was prepared from 360 g of water, 39 g of Pentamethonium dibromide (50% solution), 35.6 g of Aerosil 130 silica, 6.9 g of $Al(NO_3)_3.xH_2O$ and 14.4 g of 50% sodium hydroxide solution. Then 5 g of ZSM-48 seeds was added to the mixture. The mixture had the following molar composition:

| | |
|---|---|
| $SiO_2/Al_2O_3$ | 60 |
| $H_2O/SiO_2$ | 40 |
| $OH^-/SiO_2$ | 0.33 |
| $Na^+/SiO_2$ | 0.33 |
| Diquat-5/$SiO_2$ | 0.1 |

The mixture was aged at room temperature with stirring at 100 rpm for 24 hours, and then reacted at 320° F. (160° C.) in a 600 ml autoclave with stirring at 100 RPM for 96 hours. The product was filtered, washed with deionized (DI) water and dried at 250° F. (120° C.). The XRD pattern of the as-synthesized material showed the typical phase of ZSM-48 topology. The SEM of the as-synthesized material showed that the material was composed of agglomerates of fibrous-like crystals. The resulting as-synthesized ZSM-48 crystals had a $SiO_2/Al_2O_3$ molar ratio of ~52/1.

Example 4

Preparation of High Activity ZSM-48 using Diquat-5 at Low $OH^-/SiO_2$ Ratio

A mixture was prepared from 1195 g of water, 69 g of Pentamethonium dibromide (50% solution), 228 g of Aerosil 200 silica, 22.2 g of 45% sodium aluminate and 41 g of 50% sodium hydroxide solution, and 1.3 g of 47% $H_2SO_4$ solution. Then 10 g of ZSM-48 seeds was added to the mixture. The mixture had the following molar composition:

| | |
|---|---|
| $SiO_2/Al_2O_3$ | 62 |
| $H_2O/SiO_2$ | 21 |
| $OH^-/SiO_2$ | 0.18 |
| $Na^+/SiO_2$ | 0.18 |
| Diquat-5/$SiO_2$ | 0.03 |

Figure 3A:
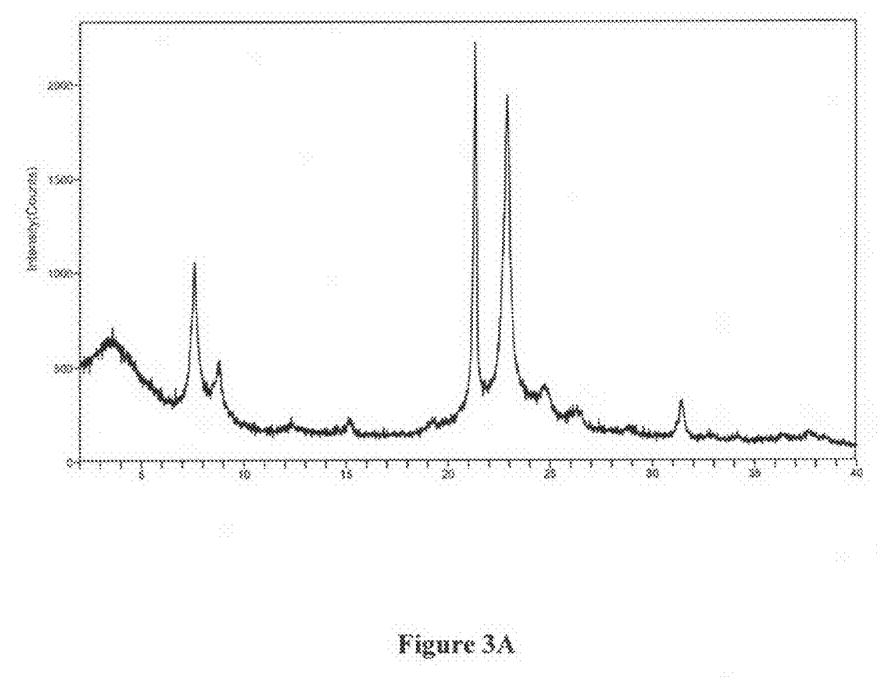
FIG. 3A is an X-ray diffraction pattern of the as-synthesized product of Example 4.
Figure 3B:
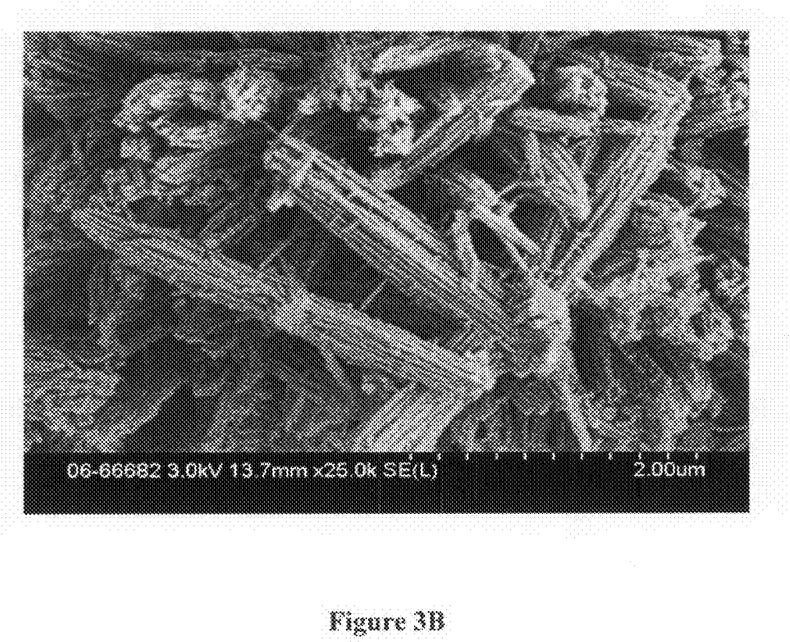
FIG. 3B is a scanning electron micrograph (SEM) of the as-synthesized product of Example 4.

The mixture was reacted at 320° F. (160° C.) in a 2-liter ml autoclave with stirring at 250 RPM for 96 hours. The product was filtered, washed with deionized (DI) water and dried at 250° F. (120° C.). The XRD pattern (see FIG. 3A) of the as-synthesized material showed the typical phase of ZSM-48 topology. The SEM (see FIG. 3B) of the as-synthesized material showed that the material was composed of agglomerates of elongated needle or fibrous-like crystals. The as-synthesized crystals were converted into the hydrogen form by three ion exchanges with ammonium nitrate solution at room temperature, followed by drying at 250° F. (120° C.) and calcination at 1000° F. (540° C.) for 6 hours. The resulting ZSM-48 crystals had a $SiO_2/Al_2O_3$ molar ratio of about 60, an Alpha value of 120 and surface area of 325 $m^2/g$, and n-hexane sorption of 42.1 mg/g.

Example 5

Preparation of High Activity ZSM-48 using Mixture Diquat-5 and Diquat-6 (Diquat-5/Diquat-6 Molar Ratio of 2.8)

A mixture was prepared from 1200 g of water, 17 g of Hexamethonium dichloride (56% solution), 60 g of Pentamethonium dibromide (50% solution), 228 g of Ultrasil silica, 16 g of sodium aluminate solution (45%), and 40 g of 50% sodium hydroxide solution. Then 10 g of ZSM-48 seeds was added to the mixture. The mixture had the following molar composition:

| | |
|---|---|
| $SiO_2/Al_2O_3$ | 81 |
| $H_2O/SiO_2$ | 20 |
| $OH^-/SiO_2$ | 0.17 |
| $Na^+/SiO_2$ | 0.17 |
| Diquat-5/$SiO_2$ | 0.025 |
| Diquat-6/$SiO_2$ | 0.009 |

Figure 4A:
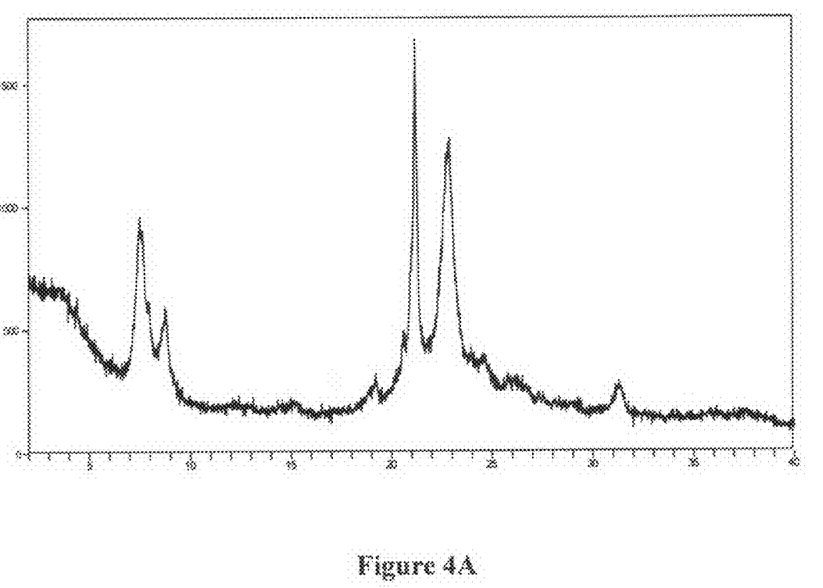
FIG. 4A is an X-ray diffraction pattern of the as-synthesized product of Example 5.
Figure 4B:
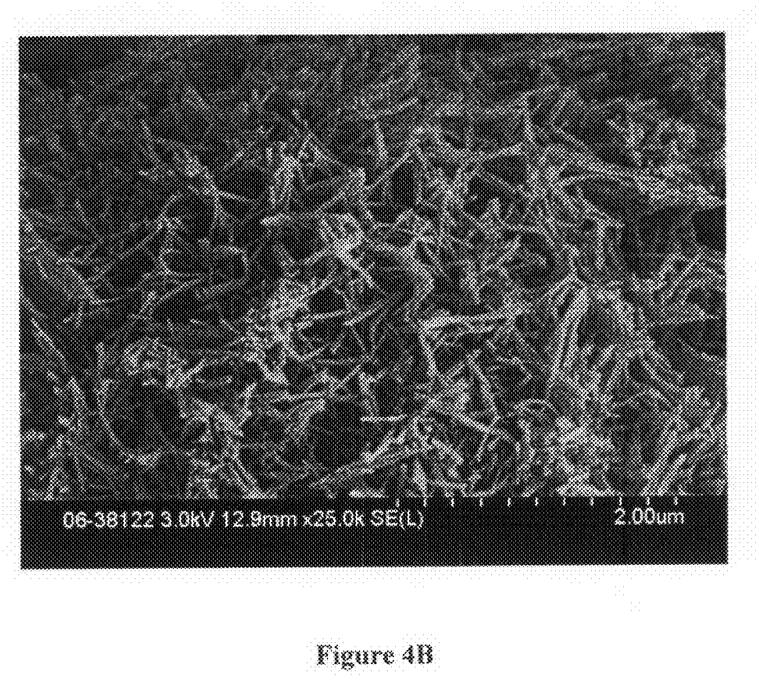
FIG. 4B is a scanning electron micrograph (SEM) of the as-synthesized product of Example 5.

The mixture was reacted at 320° F. (160° C.) in a 2-liter autoclave with stirring at 350 RPM for 48 hours. The product was filtered, washed with deionized (DI) water and dried at 250° F. (120° C.). The XRD pattern (FIG. 4A) of the as-synthesized material showed the product to be of ZSM-48 topology with a trace of ZSM-50 impurity. The SEM (FIG. 4B) of the as-synthesized material showed that the material was composed of agglomerates of elongated needle-like/fibrous-like crystals. The as-synthesized crystals were converted into the hydrogen form by three ion exchanges with ammonium nitrate solution at room temperature, followed by drying at 250° F. (120° C.) and calcination at 1000° F. (540° C.) for 6 hours. The resulting ZSM-48 crystals had a $SiO_2/Al_2O_3$ molar ratio of 74.2, an Alpha value of 57 at Na=960 ppm, surface area of 222 $m^2/g$, and n-hexane sorption of 33.4 mg/g.

Example 6

Preparation of High Activity ZSM-48 using Mixture Diquat-5 and Diquat-6 (Diquat-5/Diquat-6 Molar Ratio of 1)

A mixture was prepared from 1200 g of water, 17 g of Hexamethonium dichloride (56% solution), 23 g of Pentamethonium dibromide (50% solution), 228 g of Ultrasil silica, 16 g of sodium aluminate solution (45%), 1.3 g of 98% $H_2SO_4$ solution, and 40 g of 50% sodium hydroxide solution. Then 10 g of HA-ZSM-48 seed ($SiO_2/Al_2O_3$ about 70/1) was added to the mixture. The mixture had the following molar composition:

| | |
|---|---|
| $SiO_2/Al_2O_3$ | 81 |
| $H_2O/SiO_2$ | 20 |
| $OH^-/SiO_2$ | 0.17 |
| $Na^+/SiO_2$ | 0.17 |
| Diquat-5/$SiO_2$ | 0.01 |
| Diquat-6/$SiO_2$ | 0.01 |

Figure 5A:
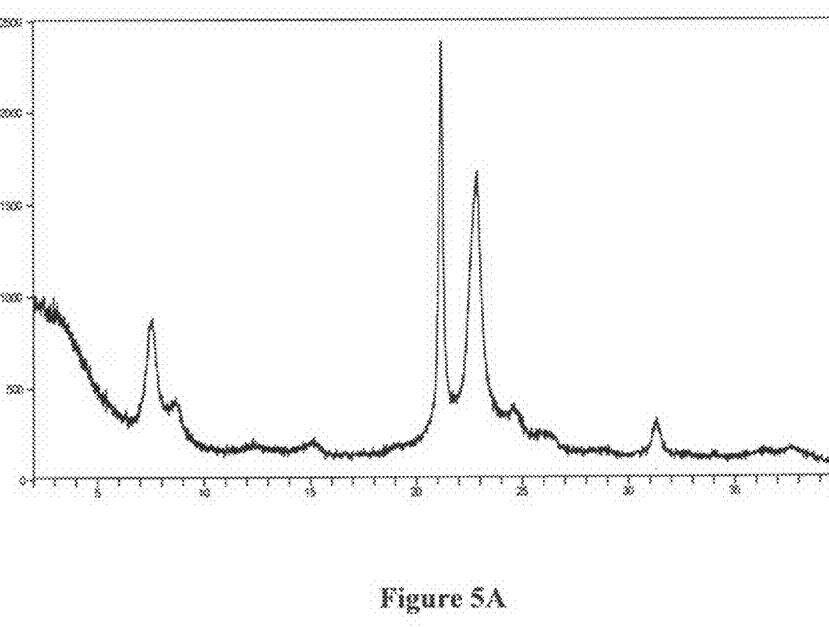
FIG. 5A is an X-ray diffraction pattern of the as-synthesized product of Example 6.
Figure 5B:
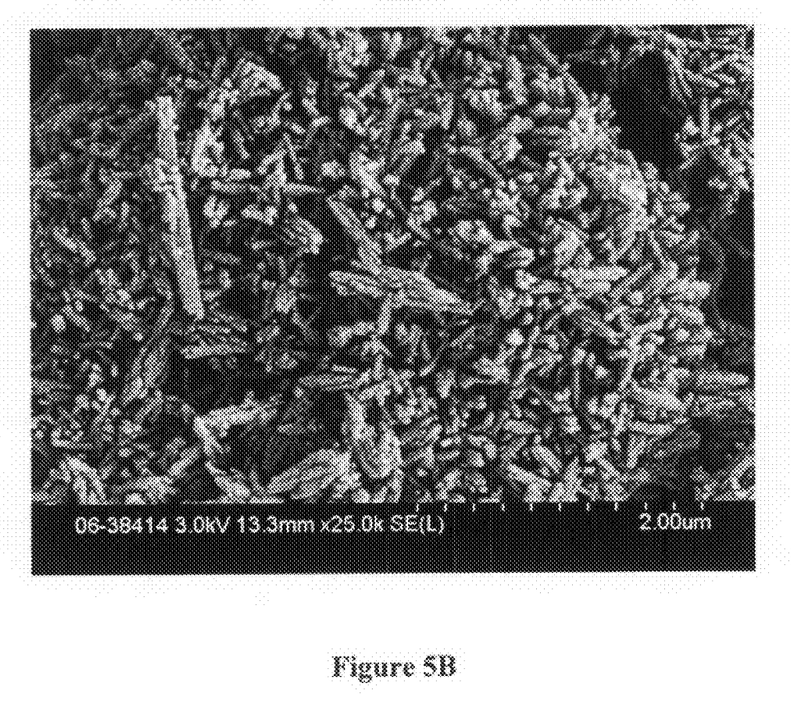
FIG. 5B is a scanning electron micrograph (SEM) of the as-synthesized product of Example 6.

The mixture was reacted at 320° F. (160° C.) in a 2-liter autoclave with stirring at 350 RPM for 48 hours. The product was filtered, washed with deionized (DI) water and dried at 250° F. (120° C.). The XRD pattern (FIG. 5A) of the as-synthesized material showed the typical pure phase of ZSM-48 topology. The SEM (FIG. 5B) of the as-synthesized material showed that the material was composed of agglomerates of elongated needle-like crystals with a smaller ratio of L/D (crystals length/diameter) as compared to Example 5. The as-synthesized crystals were converted into the hydrogen form by three ion exchanges with ammonium nitrate solution at room temperature, followed by drying at 250° F. (120° C.) and calcination at 1000° F. (540° C.) for 6 hours. The resulting ZSM-48 crystals had a $SiO_2/Al_2O_3$ molar ratio of about 71, an Alpha value of 110, surface area of 281 m²/g, n-hexane sorption of 42.1 mg/g.

Example 7

Preparation of Catalyst for N-Decane Testing

A mixture was prepared by combining the H-form ZSM-48 crystals from Example 4 with alumina. The powders were mixed together using a mortar and pestle followed by pelletizing and sizing to 14/24 mesh. This material was then dried at 250° F. (120° C.) and calcined at 1000° F. (540° C.) in full air for 6 hours. The calcined material was then impregnated with platinum via incipient wetness using tetraammineplatinum nitrate followed by drying at 250° F. (120° C.) and calcination in full air at 680° F. (360° C.) for 3 hours. Hydrogen chemisorption (platinum dispersion) data on this material gave 83% dispersion.

Example 8

N-decane Testing

Figure 6A:
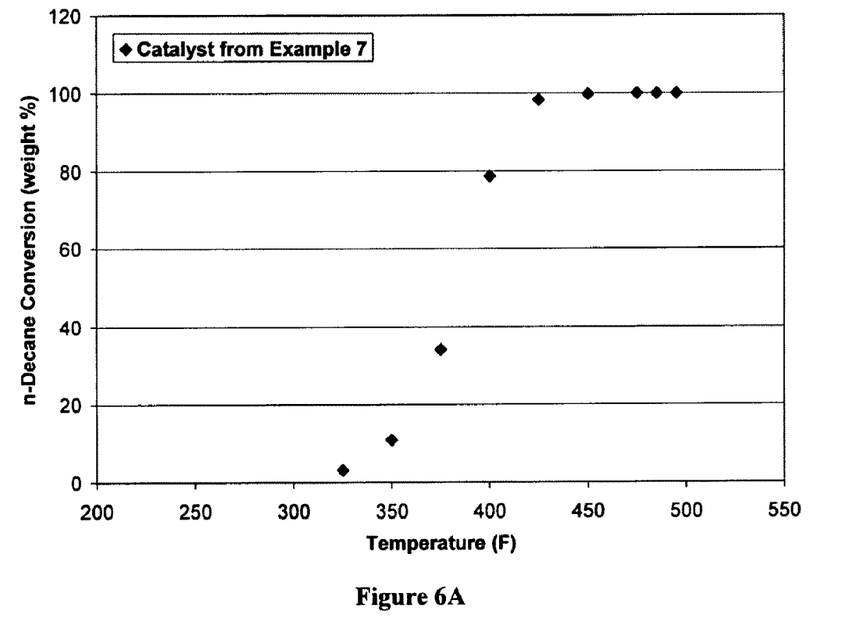
FIG. 6A is a graph of n-decane conversion against temperature in the n-decane isomerization process of Example 8.
Figure 6B:
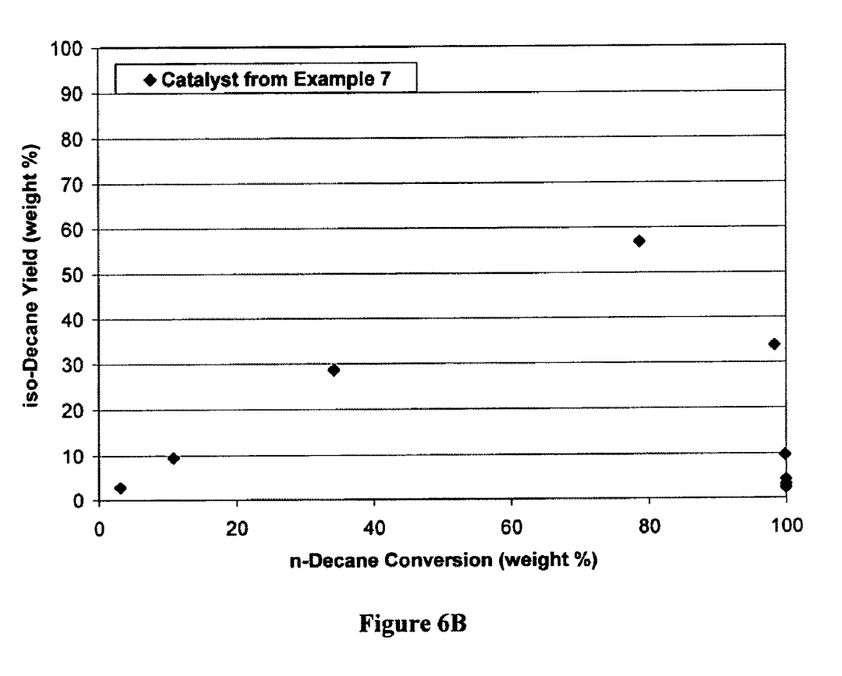
FIG. 6B is a graph of iso-decane yield against n-decane conversion in the n-decane isomerization process of Example 8.

The catalyst from Example 7 was evaluated in an atmospheric n-decane isomerization unit. Approximately 1 gram of the 14/24 mesh-sized catalyst was used for the test. The sample was first heated under nitrogen to 500° F. (260° C.), and then the flow was switched to hydrogen. Hydrogen and n-decane were flowed through the reactor while the system cooled to the first setpoint of 325° F. (163° C.). After lining out at this temperature, an on-line gas chromatograph analyzed the product exiting the isomerization unit, until the next set-point temperature was attained. The catalyst was evaluated at a total of 9 different temperatures within the range of 325° F. (163° C.) to 495° F. (257° C.). The data was retrieved and analyzed. The results are shown in FIGS. 6A and 6B, from which it will be seen that at 400° F. (204° C.) almost 80% of the n-decane has been converted (FIG. 6A) and the selectivity to iso-decane is 50-60% (FIG. 6B).

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A process for producing ZSM-48, the process comprising:
   (a) providing an aqueous reaction mixture comprising at least one source of silica, at least one source of alumina, at least one source of hydroxyl ions, at least one source of diquaternary alkylammonium, $R^{2+}$, ions having the formula:

$(CH_3)_3N^+(CH_2)_5N^+(CH_3)_3$ and optionally seed crystals, wherein said reaction mixture has a composition including the following molar ratios:
   $R^{2+}:SiO_2$ from about 0.01 to about 0.05
   $SiO_2:Al_2O_3$ from about 50 to less than 100
   $OH:SiO_2$ from about 0.1 to about 0.2; and
   (b) crystallizing said reaction mixture under conditions effective to produce said ZSM-48.

2. The process of claim 1 wherein said reaction mixture has an $H_2O:SiO_2$ molar ratio less than 30.

3. The process of claim 1 wherein said reaction mixture also comprises a source of sodium cations and has a $Na^+:SiO_2$ molar ratio less than 0.2.

4. The process of claim 1 wherein said reaction mixture also comprises a source of further diquaternary alkylammonium ions having the formula $(CH_3)_3N^+(CH_2)_nN^+(CH_3)_3$ where n is 3, 4, 6, 7, 8, 9 or 10.

5. The process of claim 4, wherein said reaction mixture also comprises a source of further diquaternary alkylammonium ions having the formula $(CH_3)_3N^+(CH_2)_6N^+(CH_3)_3$.

6. The process of claim 5 wherein the molar ratio of total diquaternary alkylammonium ions to $SiO_2$ in the reaction mixture is less than 0.1.

7. The process of claim 1 wherein said conditions in (b) include a temperature of about 120° C. to about 200° C. for a time of about 12 to about 200 hours.

8. The process of claim 1 wherein the reaction mixture comprises ZSM-48 seed crystals.

9. The process of claim 8 wherein the ZSM-48 seed crystals are present in an amount between about 50 ppm by weight to about 50,000 ppm by weight of the reaction mixture.

10. A method for dewaxing a hydrocarbon feedstock, comprising contacting the hydrocarbon feedstock under dewaxing conditions with ZSM-48 prepared by the process of claim 1 where the ZSM-48 material is further characterized as having both fibrous and needle crystalline morphology.

11. A process for producing ZSM-48, the process comprising crystallizing a an aqueous reaction mixture comprising at least one source of silica, at least one source of alumina, at least one source of hydroxyl ions, at least one source of first diquaternary alkylammonium ions having the formula:

$(CH_3)_3N^+(CH_2)_5N^+(CH_3)_3$ at least one source of second diquaternary alkylammonium ions having the formula:

$(CH_3)_3N^+(CH_2)_nN^+(CH_3)_3$ where n is 3, 4, 6, 7, 8, 9 or 10, and
optionally seed crystals.

12. The process of claim 9 wherein said second diquaternary alkylammonium ions are $(CH_3)_3N^{+(CH_2)}{}_6N^+(CH_3)_3$.

13. The process of claim 9 wherein said reaction mixture has a $SiO_2:Al_2O_3$ molar ratio less than 100.

14. The process of claim 9 wherein the molar ratio of the sum of the first diquaternary alkylammonium ions and the second diquaternary alkylammonium ions to $SiO_2$ in the reaction mixture is less than 0.1.

15. The process of claim 9 wherein the reaction mixture comprises ZSM-48 seed crystals.

16. The process of claim 15 wherein the ZSM-48 seed crystals are present in an amount between about 50 ppm by weight to about 50,000 ppm by weight of the reaction mixture.

17. The process of claim 9 wherein said crystallizing conditions include a temperature of about 120° C. to about 200° C. for a time of about 12 to about 200 hours.

18. A method for dewaxing a hydrocarbon feedstock, comprising contacting the hydrocarbon feedstock under dewaxing conditions with ZSM-48 prepared by the process of claim 11 where the ZSM-48 material is further characterized as having both fibrous and needle crystalline morphology.

* * * * *